United States Patent
Wang (10) Patent No.: US 10,726,793 B2
(45) Date of Patent: Jul. 28, 2020

(54) BACKLIGHT SELF-ADAPTIVE ADJUSTMENT METHOD AND DEVICE

(71) Applicant: SHENZHEN TCL DIGITAL TECHNOLOGY LTD., Shenzhen, Guangdong (CN)

(72) Inventor: Yunhua Wang, Guangdong (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 16/310,808

(22) PCT Filed: Aug. 26, 2016

(86) PCT No.: PCT/CN2016/096846
§ 371 (c)(1),
(2) Date: Dec. 17, 2018

(87) PCT Pub. No.: WO2017/190452
PCT Pub. Date: Nov. 9, 2017

(65) Prior Publication Data
US 2019/0147808 A1    May 16, 2019

(30) Foreign Application Priority Data

May 4, 2016   (CN) .......................... 2016 1 0293245

(51) Int. Cl.
*G09G 3/34*    (2006.01)
*H04N 21/485*  (2011.01)
*H04N 21/4788* (2011.01)

(52) U.S. Cl.
CPC ......... *G09G 3/3413* (2013.01); *H04N 21/485* (2013.01); *G09G 2320/0626* (2013.01); *G09G 2360/144* (2013.01); *G09G 2360/16* (2013.01); *H04N 21/4788* (2013.01)

(58) Field of Classification Search
CPC ......... G09G 2320/0646; G09G 3/3406; G09G 2320/0673; G09G 2320/0233; G09G 2320/0276; G09G 3/3426; G09G 3/3413; G09G 2310/0237; G09G 3/342; G09G 2320/0626
See application file for complete search history.

(56) References Cited

U.S. PATENT DOCUMENTS

| | | | | |
|---|---|---|---|---|
| 2005/0219199 A1* | 10/2005 | Huang | ................ | G09G 3/3406 345/102 |
| 2007/0040797 A1* | 2/2007 | Shih | .................... | G09G 3/3406 345/102 |
| 2014/0168236 A1* | 6/2014 | Keefe | .................. | G09G 3/3406 345/520 |

* cited by examiner

*Primary Examiner* — Koosha Sharifi-Tafreshi (57) ABSTRACT

The present disclosure discloses a backlight self-adaptive adjustment method, including: acquiring a frame of picture every preset time interval when in video mode; judging whether the first picture satisfies a preset backlight self-adaptive adjustment condition, according to the brightness difference value between a first picture currently acquired and a second picture acquired within the current preset time period, and the amount of white pixels of the first picture; acquiring the brightness value of a pixel in a third picture captured from current ambient by a camera, when the first picture satisfies the preset backlight self-adaptive adjustment condition; setting the backlight value of the display video window area of the display screen based on the brightness value of the pixel in the third picture. The disclosure also discloses a backlight self-adaptive adjustment device.

6 Claims, 7 Drawing Sheets

BACKLIGHT SELF-ADAPTIVE ADJUSTMENT METHOD AND DEVICE

FIELD

The disclosure relates to the field of display technology, and in particular, relates to a backlight self-adaptive adjustment method and device.

BACKGROUND

With the rapid development of smart liquid crystal display equipment technology, it is very convenient to watch programs and make video calls by using a smart liquid crystal display apparatus. For example, make a video call to B smart liquid crystal display equipment through A liquid crystal display device; or, make a video call to A smart liquid crystal display device through C mobile terminal. However, when a smart liquid crystal display device receives high-brightness video pictures for a long time, it will not only hurt user's eyes, but also make the liquid crystal display screen of the smart liquid crystal display device prone to generate display degradation at the position of the video window, thus reducing the display life of the liquid crystal display screen.

Although the smart liquid crystal display device in prior art has the function of automatically adjusting the backlight brightness, it only self-adaptively adjusts the screen brightness according to ambient brightness to achieve a better display effect, and cannot solve the above-mentioned problems that when the smart liquid crystal display device receives high-brightness video pictures for a long time, it damages user's eyes and makes the liquid crystal display screen prone to degrade at the position where the video window is displayed.

SUMMARY OF THE DISCLOSURE

The main purpose of the present disclosure is to provide a backlight self-adaptive adjustment method and device, aiming at solving the problem that the liquid crystal display screen is prone to degrade at the position where the video window is displayed when the smart liquid crystal display device receives high-brightness video pictures for a long time.

In order to achieve the above object, the disclosure provides a backlight self-adaptive adjustment method, which is applied to television backlight adjustment, and the backlight self-adaptive adjustment method includes the following operations:

acquiring one frame of picture every preset time interval when in video mode;

determining whether a first picture satisfies a preset backlight self-adaptive adjustment condition according to the brightness difference value between the first picture acquired at a moment and a second picture acquired within the preset time interval from the moment, and the amount of white pixels of the first picture;

turning off backlight self-adaptive adjustment mode of the television, when the first picture does not satisfy the preset backlight self-adaptive adjustment condition;

turning on backlight self-adaptive adjustment mode of the television, acquiring the brightness value of a pixel in a third picture captured from current ambient by a camera; and detecting the brightness of the current ambient via the camera, and determining the adjustment range of the backlight value of the display screen according to the brightness of the current ambient, when the first picture satisfies the preset backlight self-adaptive adjustment condition;

determining the backlight brightness of the third picture according to the brightness value of a pixel in the third picture; and setting a backlight value of the display video window area of the display screen within the determined adjustment range of the backlight value of the display screen, according to the backlight brightness of the third picture.

In order to achieve the above object, the present disclosure also provides a backlight self-adaptive adjustment method, which is applied to television backlight adjustment, and the backlight self-adaptive adjustment method includes the following operations:

acquiring one frame of picture every preset time interval when in video mode;

determining whether a first picture satisfies a preset backlight self-adaptive adjustment condition according to the brightness difference value between the first picture acquired at a moment and a second picture acquired within the preset time interval from the moment, and the amount of white pixels of the first picture;

acquiring the brightness value of a pixel in a third picture captured from current ambient by a camera, when the first picture satisfies the preset backlight self-adaptive adjustment condition;

setting a backlight value of the display video window area of the display screen based on the brightness value of the pixel in the third picture.

Preferably, the operation of determining whether a first picture satisfies a preset backlight self-adaptive adjustment condition according to the brightness difference value between the first picture acquired at a moment and a second picture acquired within the preset time interval from the moment, and the amount of white pixels of the first picture includes:

calculating a plurality of brightness difference values between the brightness values of the first picture and the brightness values of the second picture;

calculating the amount of white pixels among a row of pixels in the first picture when the maximum brightness difference value among the plurality of brightness difference values is less than a first preset value;

determining that the first picture satisfies the preset backlight self-adaptive adjustment condition when the proportion of the amount of the white pixels to the amount of pixels in the whole row is larger than a second preset value.

Preferably, the operation of calculating a plurality of brightness difference values between the brightness values of the first picture and the brightness values of the second picture includes:

respectively acquiring a row of pixels of the first picture and a row of pixels of the second picture at a same position, and determining the brightness values of each pixel in the rows;

respectively calculating the brightness difference value between a pixel among a row of pixels of the first picture and a pixel among a row of pixels of the second picture at the same position, and to acquire the plurality of brightness difference values.

Preferably, the operation of setting a backlight value of the display video window area of the display screen based on the brightness value of the pixel in the third picture includes:

determining the backlight brightness of the third picture according to the brightness value of a pixel in the third picture; and setting a backlight value of the display video window area of the display screen within the determined adjustment range of the backlight value of the display screen, according to the backlight brightness of the third picture.

Preferably, before the operation of determining the backlight brightness of the third picture according to the brightness value of a pixel in the third picture, the method also includes:

detecting the brightness of the current ambient via the camera, and determining the adjustment range of the backlight value of the display screen according to the brightness of the current ambient.

In addition, in order to achieve the above object, the present disclosure also provides a backlight self-adaptive adjustment device, which is applied to television backlight adjustment, and the backlight self-adaptive adjustment device includes:

a first acquiring module, configured to acquire one frame of picture every preset time interval in video mode;

a judging module, configured to determine whether a first picture satisfies the preset backlight self-adaptive adjustment condition according to the brightness difference value between the first picture acquired at a moment and a second picture acquired within the preset time interval from the moment, and the amount of white pixels of the first picture;

a second acquiring module, configured to acquire the brightness value of a pixel in a third picture captured from current ambient by a camera, when the first picture satisfies the preset backlight self-adaptive adjustment condition;

a setting module, configured to set the backlight value of the display video window area of the display screen based on the brightness value of the pixel in the third picture.

Preferably, the judging module includes:

a first calculating unit, configured to calculate a plurality of brightness difference values between the brightness values of the first picture and the brightness values of the second picture;

a second calculating unit, configured to calculate the amount of white pixels among a row of pixels in the first picture when the maximum brightness difference value among the plurality of brightness difference values is less than a first preset value;

a determining unit, configured to determine that the first picture satisfies the preset backlight self-adaptive adjustment condition when the proportion of the amount of the white pixels to the amount of pixels in the whole row is larger than a second preset value.

Preferably, the first calculating unit is also configured to respectively acquiring a row of pixels of the first picture and a row of pixels of the second picture at a same position, and determining the brightness values of each pixel in the rows;

respectively calculating the brightness difference value between a pixel among a row of pixels of the first picture and a pixel among a row of pixels of the second picture at the same position, and to acquire the plurality of brightness difference values.

Preferably, the setting module includes:

a determining unit, configured to determine the backlight brightness of the third picture according to the brightness value of a pixel in the third picture; and a setting unit, configured to set the backlight value of the display video window area of the display screen within the determined adjustment range of the backlight value of the display screen, according to the backlight brightness of the third picture.

Preferably, the backlight self-adaptive adjustment device further includes:

a detecting module, configured to detect the brightness of the current ambient via the camera, and determining the adjustment range of the backlight value of the display screen according to the brightness of the current ambient.

The present disclosure acquires one frame of picture every preset time interval in video mode, determines whether a first picture satisfies a preset backlight self-adaptive adjustment condition according to the brightness difference value between the first picture acquired at a moment and a second picture acquired within the preset time interval from the moment, and the amount of white pixels of the first picture, acquires the brightness value of a pixel in a third picture captured from current ambient by a camera, when the first picture satisfies the preset backlight self-adaptive adjustment condition, sets the backlight value of the display video window area of the display screen based on the brightness value of the pixel in the third picture. Since the smart acquires one frame of picture every preset time interval, calculate the brightness difference value between the first picture and a second picture acquired within the preset time interval from the moment, and determine the amount of white pixels of the first picture, so as to determine whether a first picture satisfies a preset backlight self-adaptive adjustment condition; when satisfying, then it is determined that the video picture acquired by the smart system is of high brightness in a long time, control the camera to take a picture from current ambient and acquire the brightness value of a pixel of the current ambient picture, set the backlight value of the display video window area of the display screen according to the brightness value of a pixel in the current ambient picture, thereby make the backlight value of the display video window area of the display screen dynamic and changes according to the brightness value of the pixel of the current ambient picture, decreasing the risk of degradation that is prone to occur to display screen at the display video window as a result.

The implementation, functional features and advantages of the present disclosure will be further described with reference to the accompanying drawings in connection with the embodiments.

DETAILED DESCRIPTION OF THE EMBODIMENTS

It should be understood that the specific embodiments described herein are only for the purpose of explaining the present disclosure and are not intended to limit the present disclosure.

Based on the above problems, the present disclosure provides a method.

Figure 1:
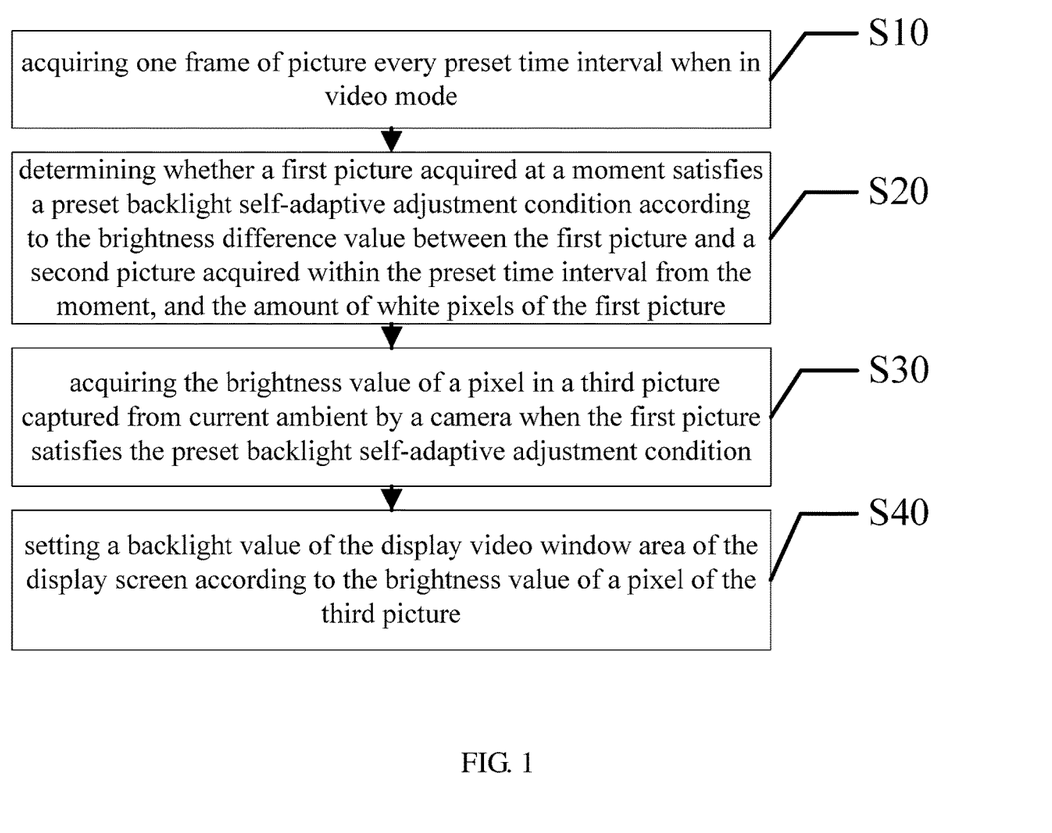
FIG. 1 is a flowchart of the first embodiment of the backlight self-adaptive adjustment method according to the present disclosure.

Referring to FIG. 1, FIG. 1 is a flowchart of the backlight self-adaptive adjustment method in the first embodiment according to the present disclosure.

In this embodiment, the method includes:

Operation S10, in video mode, one frame of picture is acquired every preset time interval.

In this embodiment, the smart liquid crystal display device includes a computer, a smart TV, and a smart phone. After the smart liquid crystal display device receives the chat request instructions sent by other smart liquid crystal display devices, it opens the video chat window at its terminal and opens a camera at its terminal. After the detecting video chat application module in the smart liquid crystal display device determines that the current running package of the smart liquid crystal display device is a video chat application by looking up the table, the smart liquid crystal display device enters a video chat mode. In the video mode, one frame of picture displayed by the smart liquid crystal display device is acquired every preset time interval, and the picture is an intercepted video picture. For example, in the video mode, one frame of video picture displayed by the smart liquid crystal display device is acquired every 5 s.

It should be noted that in video chat mode, the smart liquid crystal display device can acquire 60 frames of video pictures within 1 s, and then arbitrarily select one frame from the 60 frames of video pictures as the picture for calculation.

Operation S20, determining whether a first picture satisfies a preset backlight self-adaptive adjustment condition according to the brightness difference value between the first picture acquired at a moment and a second picture acquired within the preset time interval from the moment, and the amount of white pixels of the first picture;

Operation S30, acquires the brightness value of a pixel in a third picture captured from current ambient by a camera, when the first picture satisfies the preset backlight self-adaptive adjustment condition, After acquiring the current first picture and the second picture acquired within the preset time interval from the moment, the brightness value of the pixel of the current ambient picture and the brightness value of the pixel of the first picture are acquired, and the amount of white pixels of the current ambient picture is acquired. Calculating the brightness difference values between the brightness value of the first picture and the brightness value of the second picture, for example, when the smart liquid crystal display device is video for 10 s, acquiring a frame picture at 10 s and a frame picture at 5 s, detecting the brightness value A of the frame picture at 10 s and the brightness value B of the frame picture at 5 s, calculating the brightness difference value between A and B, determining the proportion of the amount of white pixels in the acquired first picture when the brightness difference value is less than or equal to the first preset value, determining that the first picture satisfies the preset backlight self-adaptive adjustment condition when the proportion of the amount of white pixels in the first picture exceeds a second preset value, thereby determining that the video picture acquired by the smart liquid crystal display device is of high brightness for a long time, and the display screen of the smart liquid crystal display device displays highly bright video picture. After determining that the display screen of the smart liquid crystal display device displays highly bright video picture for a long time, backlight self-adaptive adjustment mode is turned on, and the smart liquid crystal display device controls the local camera to take a picture of the current ambient and acquire the brightness values of each pixel in the third picture taken by a camera from the current ambient.

It can be understood that the smart liquid crystal display device acquires one frame of picture every preset time interval, detects whether the first picture acquired at a moment satisfies the preset condition that the brightness difference value between the brightness value of the first picture and the brightness value of the second picture is less than the first preset value, and the proportion of white pixels in the first picture exceeds the second preset value, when satisfying, continue to run backlight self-adaptive adjustment mode; when not satisfying, the display screen of the smart liquid crystal display device doesn't display highly bright video picture for a long time, backlight self-adaptive adjustment mode is turned off.

Operation S40, setting a backlight value of the display video window area of the display screen based on the brightness value of the pixel in the third picture.

After backlight self-adaptive adjustment mode is turned on, dynamically adjust the backlight brightness of the display screen of the smart liquid crystal display device, and the function of dynamical adjustment of the backlight brightness of the display screen of the smart liquid crystal display device is associated with the brightness value of a pixel of a current ambient picture, i.e. the backlight value of the display video window area of the display screen is set according to the brightness value of a pixel of a current ambient picture, so that the backlight value of the video chat window area of the smart liquid crystal display device is switched according to the change of the current video chat ambient all the time.

According to this embodiment, the method acquires one frame of picture every preset time interval in video mode, determines whether a first picture satisfies a preset backlight self-adaptive adjustment condition according to the brightness difference value between the first picture acquired at a moment and a second picture acquired within the preset time interval from the moment, and the amount of white pixels of the first picture, acquires the brightness value of a pixel in a third picture captured from current ambient by a camera, when the first picture satisfies the preset backlight self-adaptive adjustment condition, sets the backlight value of the display video window area of the display screen based on the brightness value of the pixel in the third picture. Since the smart acquires one frame of picture every preset time interval, calculate the brightness difference value between the first picture and a second picture acquired within the preset time interval from the moment, and determine the amount of white pixels of the first picture, so as to determine whether a first picture satisfies a preset backlight self-adaptive adjustment condition; when satisfying, then it is determined that the video picture acquired by the smart system is of high brightness in a long time, control a camera to take a picture from current ambient and acquire the brightness value of a pixel of the current ambient picture, set the backlight value of the display video window area of the display screen according to the brightness value of a pixel in the current ambient picture, thereby make the backlight value of the display video window area of the display screen dynamic and changes according to the brightness value of the pixel of the current ambient picture, decreasing the risk of degradation that is prone to occur to display screen at the display video window as a result.

Figure 2:
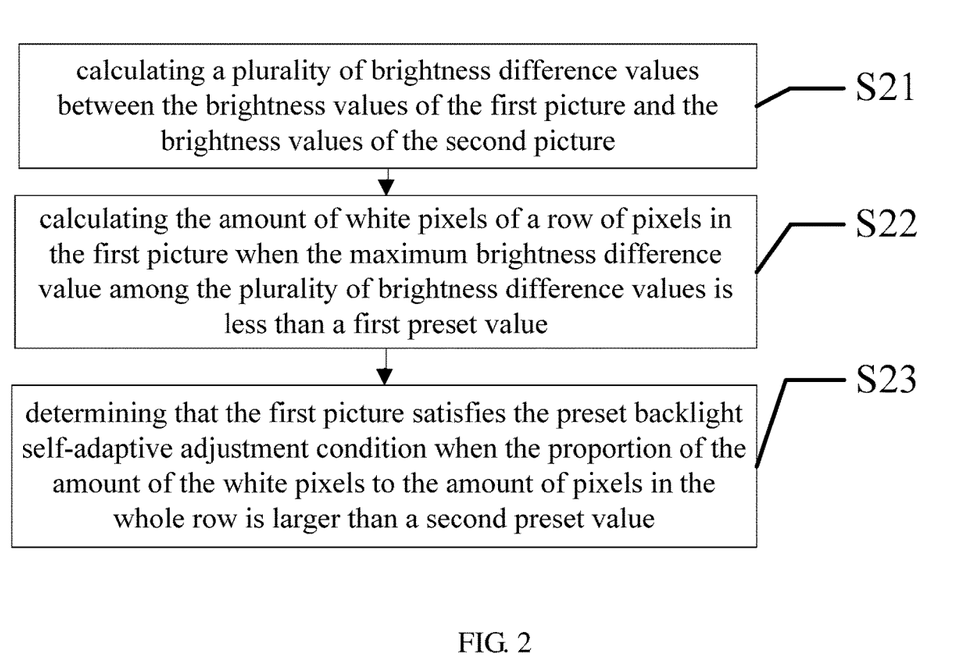
FIG. 2 is a flowchart of the detailed operations of S20 in the first embodiment shown in FIG. 1 according to the present disclosure.

Further, please refer to FIG. 2, FIG. 2 is a flowchart of the detailed operations of S20 in the first embodiment according to the present disclosure, the detailed operations of S20 includes:

Operation S21, calculating a plurality of brightness difference values between the brightness values of the first picture and the brightness values of the second picture.

In this embodiment, the smart liquid crystal display device detects pixels of the first picture and the second picture to obtain three brightness components of Rgain (red pixel), Ggain (green pixel) and Bgain (blue pixel) of the pixels, namely picture brightness value, and subtracts the picture brightness values acquired within the preset time interval from the moment brightness values to obtain a plurality of brightness difference values.

Operation S22, calculating the amount of white pixels among a row of pixels in the first picture when the maximum brightness difference value among the plurality of brightness difference values is less than a first preset value;

after calculating a plurality of brightness difference values between the brightness values of the first picture and the brightness values of the second picture, the smart liquid crystal display device acquiring a maximum brightness difference value among the plurality of brightness difference values, determining whether the maximum brightness difference value is less than a preset value, for example, the preset picture brightness value is 255, determining whether the maximum brightness difference value is less than one tenth of the preset picture brightness value, when the maximum brightness difference value is less than the preset value, determining that the current video picture is the same with the video picture within the preset time interval from the moment, i.e., the video picture remaining unchanged for a long time, then scanning the picture acquired at a moment, and calculating the amount of white pixels in any row of pixels in the picture. For example, scanning the picture acquired at a moment, detecting pixels in the 20th row of the picture of which the Rgain (red pixel) value, Ggain (green pixel) value and Bgain (blue pixel) value are 255 respectively, and calculating the amount of pixels in the 20th row of the picture of which the Rgain (red pixel) value, Ggain (green pixel) value and Bgain (blue pixel) value are 255 respectively.

Operation S23, determining that the first picture satisfies the preset backlight self-adaptive adjustment condition when the proportion of the amount of the white pixels to the amount of pixels in the whole row is larger than a second preset value.

After calculating the amount of white pixels in a row of pixels in the picture acquired at a moment, counting the proportion of the amount of white pixels in the row of pixels to the amount of pixels in the row, when the proportion is more than 3 times the preset value, for example, the 20th row of the picture has 1920 pixels, of which 700 are white pixels, the proportion of white pixels in the row can be counted to be more than 30%, then it is determined that the brightness of the current video picture satisfies the preset backlight self-adaptive adjustment condition, that is, the brightness of the current video picture is very high.

According to this embodiment, the method calculates a plurality of brightness difference values between the brightness values of the first picture and the brightness values of the second picture, calculates the amount of white pixels among a row of pixels in the first picture when the maximum brightness difference value among the plurality of brightness difference values is less than a first preset value, determines that the first picture satisfies the preset backlight self-adaptive adjustment condition when the proportion of the amount of the white pixels to the amount of pixels in the whole row is larger than a second preset value, so as to turn on backlight self-adaptive adjustment mode to adjust the backlight value of the display video window area of the display screen, after detecting out that the video image is of high brightness for a long time by the smart liquid crystal display device.

Figure 3:
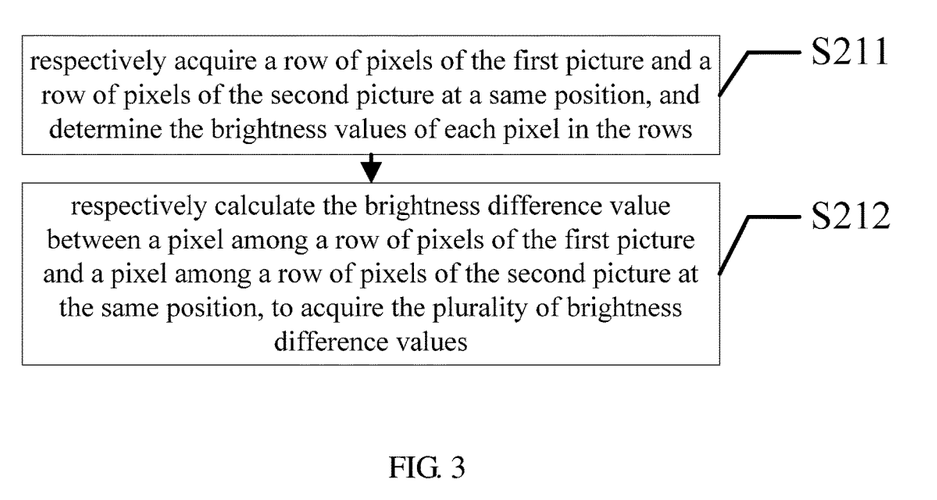
FIG. 3 is a flowchart of the detailed operations of S21 of the backlight self-adaptive adjustment method according to the present disclosure.

Further, please refer to FIG. 3, FIG. 3 is a flowchart of the detailed operations of S21 according to the present disclosure, the detailed operations of S21 includes:

Operation S211, acquiring a row of pixels of the first picture and a row of pixels of the second picture which having the same position with that of the first position respectively, and determining the brightness value of each pixel of the rows.

In this embodiment, the smart liquid crystal display device scans the picture acquired at a moment to acquire any row of pixels in the first picture, at the same time, scans the second picture to acquire a row of pixels at the same position of the two frames of pictures respectively, and determines the R value, G value and B value of pixels in the two rows of pixels. For example, acquiring the R value, G value and B value of the pixels in 20th row of the frame picture at 10 s, and the R value, G value and B value of the pixels in 20th row of the frame picture at 5 s.

Operation S212, respectively calculating the brightness difference value between a pixel among a row of pixels of the first picture and a pixel among a row of pixels of the second picture at the same position, and to acquire the plurality of brightness difference values.

After determining the brightness value of each pixel in the two rows of pixels respectively, acquiring the brightness value of each pixel in a row of pixels in the first picture and a certain brightness value in the bright values of each pixel in a row of pixels in the second picture respectively, subtracting the same brightness value of the pixel in the same position of the second picture from a certain brightness value of a certain pixel in the first picture to obtain the brightness difference value. For example, acquire the R value of each pixel in the 20th row of a frame picture at 10 s and a frame picture at 5 s respectively, subtract the R values of each pixel in the 20th row of a frame picture at 10 s and the R values of each pixel in the 20th row of a frame picture at 5 s correspondingly to obtain the brightness difference value of each pixel.

It should be noted that since the video picture remains unchanged for a long time, the brightness difference value is theoretically equal to 0.

According to the embodiment, a row of pixels of the first picture and of the second picture in the same position are respectively acquired, the brightness value of each pixel in the row of pixels is determined, and the brightness difference value of a pixel in the row of pixels of the first picture and a pixel in the same position in the row of pixels of the second picture are respectively calculated, so that a plurality of brightness difference values are acquired, and the smart liquid crystal display device can determine whether the current video chat is in the same state for a long time.

Figure 4:
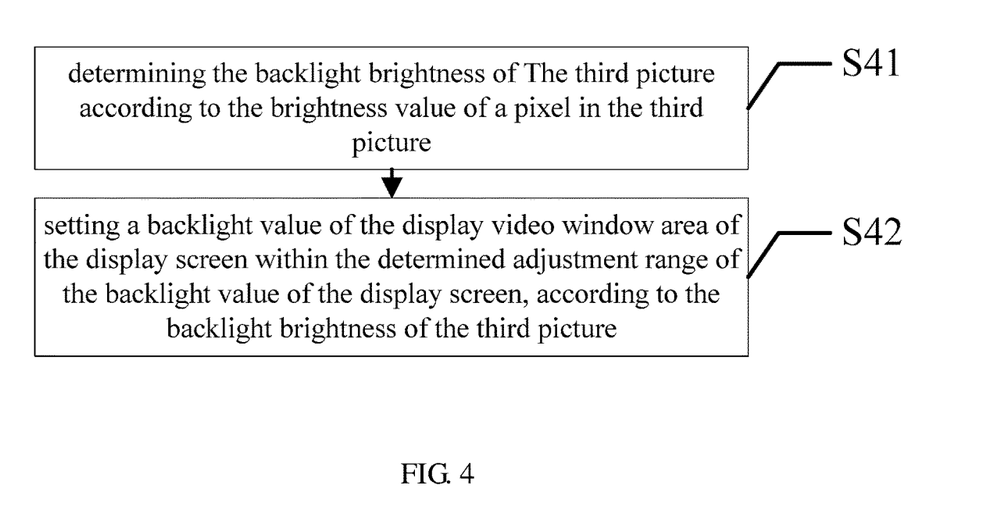
FIG. 4 is a flowchart of the detailed operations of S40 in the first embodiment shown in FIG. 1 according to the present disclosure.

Further, please refer to FIG. 4, FIG. 4 is a flowchart of the detailed operations of S40 in the first embodiment according to the present disclosure, the detailed operations of S40 includes:

Operation S41, determining the backlight brightness of the third picture according to the brightness value of a pixel in the third picture.

In this embodiment, the smart liquid crystal display device takes a third picture from the current ambient through the local camera, obtains the brightness value of a pixel in the third picture, uses the brightness value of a certain type of pixel in the third picture as the brightness reference value, and determines the backlight brightness of the third picture according to the brightness reference value. For example, the smart liquid crystal display device takes an ambient picture from the current ambient through the local camera, obtains the R value, G value and B value of a pixel in the third picture, and then uses R value, G value and B value of a gray pixel in the picture as the brightness reference value, and determines the brightness reference value as the R value, G value and B value of the backlight brightness of the third picture.

Operation S42, setting a backlight value of the display video window area of the display screen within the determined adjustment range of the backlight value of the display screen, according to the backlight brightness of the third picture.

After determining the backlight brightness of the third picture according to the brightness value of a pixel in the third picture, the smart liquid crystal display device setting a backlight value of the display video window area of the display screen within the determined adjustment range of the backlight value of the display screen, according to the backlight brightness of the third picture. Among them, when there is a shield in front of a camera, the brightness value of the pixel in the third picture is larger, and when there is no shield in front of a camera, the brightness value of the pixel in the third picture is smaller.

For example, the R value, the G value, and the B value of a gray pixel in the picture are 206, 206, 206, respectively, which are used as brightness reference value, the smart liquid crystal display device sets the R backlight value of the display video window area of the display screen to 206 according to the R value of the gray pixel in the picture, sets the G backlight value of the display video window area of the display screen to 206 according to the G value of the gray pixel in the picture, and sets the B backlight value of the display video window area of the display screen to 206 according to the B value of the gray pixel in the picture.

Alternatively, after acquiring the brightness value of a pixel in the third picture, the video chat receiving terminal sends a request instruction to modify the backlight brightness of the picture to the video chat initiating terminal, and the video chat initiating terminal modifies the backlight brightness of the picture according to the brightness value of the pixel in the third picture acquired by the video chat receiving terminal.

According to the embodiment, the backlight brightness of the third picture is determined according to the brightness value of the pixel in the third picture, and the backlight value of the display video window area of the display screen is set within the determined adjustment range of the backlight value of the display screen, so that the smart liquid crystal display device can adjust the backlight value of the display video window area of the display screen based on the backlight brightness of the current ambient picture, thereby avoiding the phenomenon that the display screen is prone to degrade at the position of the display video window and achieving a better display effect.

Figure 5:
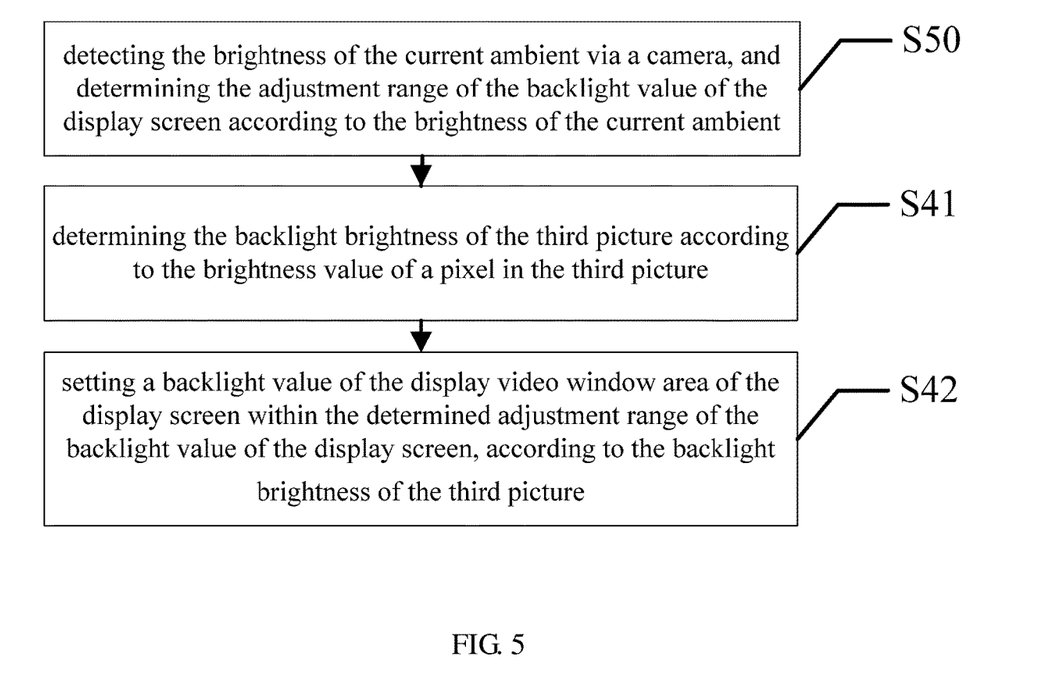
FIG. 5 is a flowchart of the second embodiment of the backlight self-adaptive adjustment method according to the present disclosure.

Further, please refer to FIG. 5, FIG. 5 is the second embodiment of the backlight self-adaptive adjustment method according to the present disclosure. In this embodiment, before the operation S41, the method further includes:

Operation S50: a camera detects the current ambient brightness and determines the adjustment range of the backlight value of the display screen according to the current ambient brightness.

In this embodiment, the smart liquid crystal display device detects the current ambient brightness through a camera to determine the adjustment range of the backlight value of the display screen of the smart liquid crystal display device under the current ambient brightness, and obtain the backlight value of the display screen under the current ambient. Where the adjustment range of the backlight value includes [0,255] and [0,180], for example, when the smart liquid crystal display device detects through a camera that it is currently in a fluorescent lamp ambient, the adjustment range of the backlight value of the display screen of the smart liquid crystal display device is determined to be [0,255] in the fluorescent lamp ambient, and the backlight value of the display screen of the smart liquid crystal display device is detected to be 130 in the current ambient.

According to the embodiment, the camera detects the current ambient brightness and determines the adjustment range of the display screen backlight value according to the current ambient brightness, so that the display screen backlight value of the smart liquid crystal display device can be dynamically adjusted in the preset adjustment range.

The disclosure further provides a backlight self-adaptive adjustment device.

Figure 6:
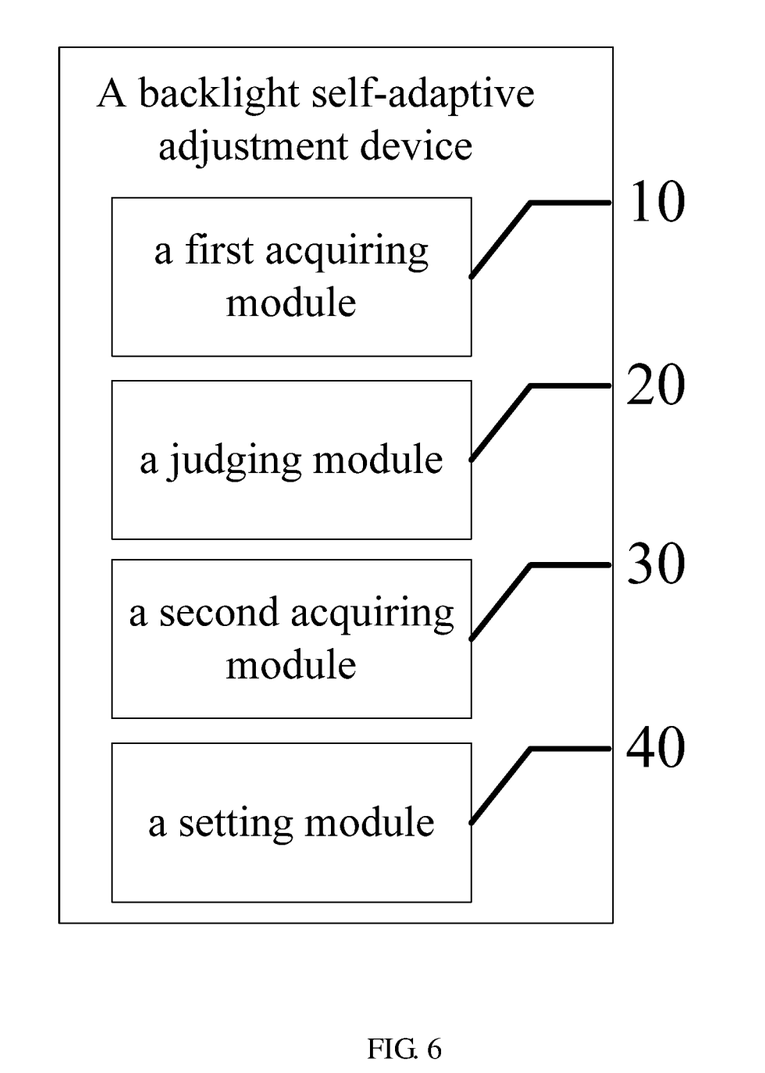
FIG. 6 is a schematic diagram of the functional modules of the backlight self-adaptive adjustment device in the first embodiment according to the present disclosure.

Referring to FIG. 6, FIG. 6 is a schematic diagram of the functional modules of the backlight self-adaptive adjustment device in the first embodiment according to the present disclosure;

In this embodiment, the device includes a first acquiring module 10, a judging module 20, a second acquiring module 30, and a setting module 40.

The first acquiring module 10 is configured to acquire one frame of picture every preset time interval in the video mode;

the judging module 20 is configured to determine whether a first picture satisfies the preset backlight self-adaptive adjustment condition according to the brightness difference value between the first picture currently acquired and a second picture acquired within the preset time interval from the moment, and the amount of white pixels of the first picture;

the second acquiring module 30 is configured to acquire the brightness value of a pixel in a third picture captured from current ambient by a camera, when the first picture satisfies the preset backlight self-adaptive adjustment condition;

the setting module 40 is configured to set the backlight value of the display video window area of the display screen based on the brightness value of the pixel in the third picture.

In the specific implementation process, the functions of each module in the backlight self-adaptive adjustment device correspond to the operations in each method operation in FIG. 1. The foregoing has described these operation operations in detail, no repeat herein.

Figure 7:
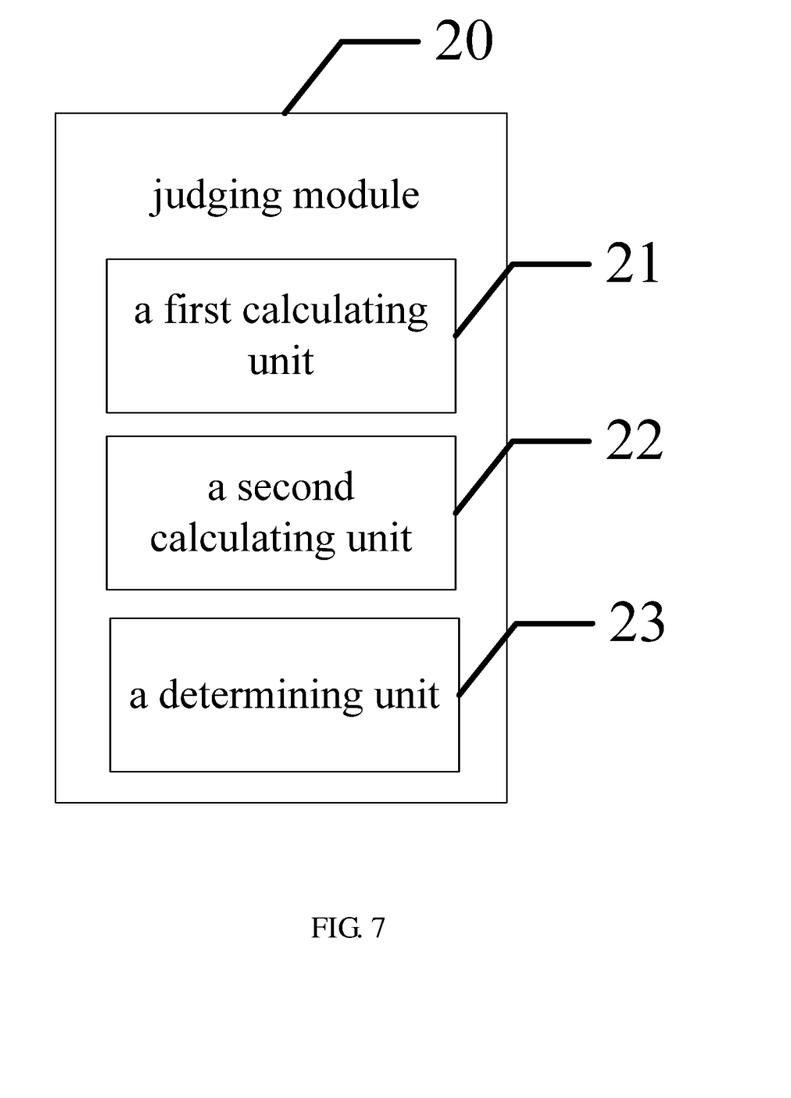
FIG. 7 is a schematic diagram of the detailed functional modules of the judging module of the backlight self-adaptive adjustment device in the second embodiment according to the present disclosure.

Further, based on the first embodiment, the second embodiment of the backlight self-adaptive adjustment device of the present disclosure is proposed, in this embodiment, referring to FIG. 7, the judging module 20 includes a first calculating unit 21, a second calculating unit 22, and a determining unit 23.

The first calculating unit 21 is configured to calculate a plurality of brightness difference values between the brightness values of the first picture and the brightness values of the second picture;

The second calculating unit 22 is configured to calculate the amount of white pixels among a row of pixels in the first picture when the maximum brightness difference value among the plurality of brightness difference values is less than a first preset value;

The determination unit 23 is configured to determine that the first picture satisfies the preset backlight self-adaptive adjustment condition when the proportion of the amount of the white pixels to the amount of pixels in the whole row is larger than a second preset value.

The first calculating unit 21 is also configured to acquire a row of pixels of the first picture and a row of pixels of the second picture at a same position, and determining the brightness values of each pixel in the rows.

The first calculating unit 21 is also configured to respectively calculate the brightness difference value between a pixel among a row of pixels of the first picture and a pixel among a row of pixels of the second picture at the same position, and to acquire the plurality of brightness difference values.

In the specific implementation process, the functions of each module in the backlight self-adaptive adjustment device correspond to operations in each method operations in FIG. 2 and FIG. 3. The foregoing has described these operation operations in detail, no repeat herein.

Further, based on the first embodiment, the third embodiment of the backlight self-adaptive adjustment device of the present disclosure is proposed. In this embodiment, referring to FIG. 8, the setting module 40 includes a determining unit 41 and a setting unit 42.

Figure 8:
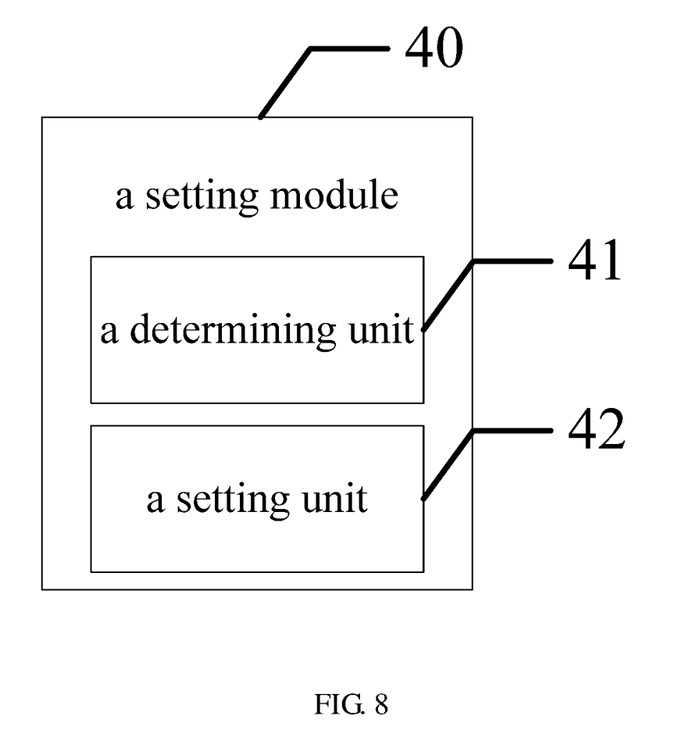
FIG. 8 is a schematic diagram of the detailed functional modules of the setting module of the backlight self-adaptive adjustment device in the third embodiment according to the present disclosure.

The determining unit 41 is configured to determine the backlight brightness of the third picture according to the brightness values of a pixel in the third picture;

the setting unit 42 is configured to set the backlight value of the display video window area of the display screen within the determined adjustment range of the backlight value of the display screen, according to the backlight brightness of the third picture.

In the specific implementation process, the functions of each module in the backlight self-adaptive adjustment device correspond to the operations in each method operation in FIG. 4. The foregoing has described these operation operations in detail, no repeat herein.

Further, based on the first embodiment, a fourth embodiment of the backlight self-adaptive adjustment device of the present disclosure is proposed. In this embodiment, referring to FIG. 9, the backlight self-adaptive adjustment device further includes a detecting module 50.

Figure 9:
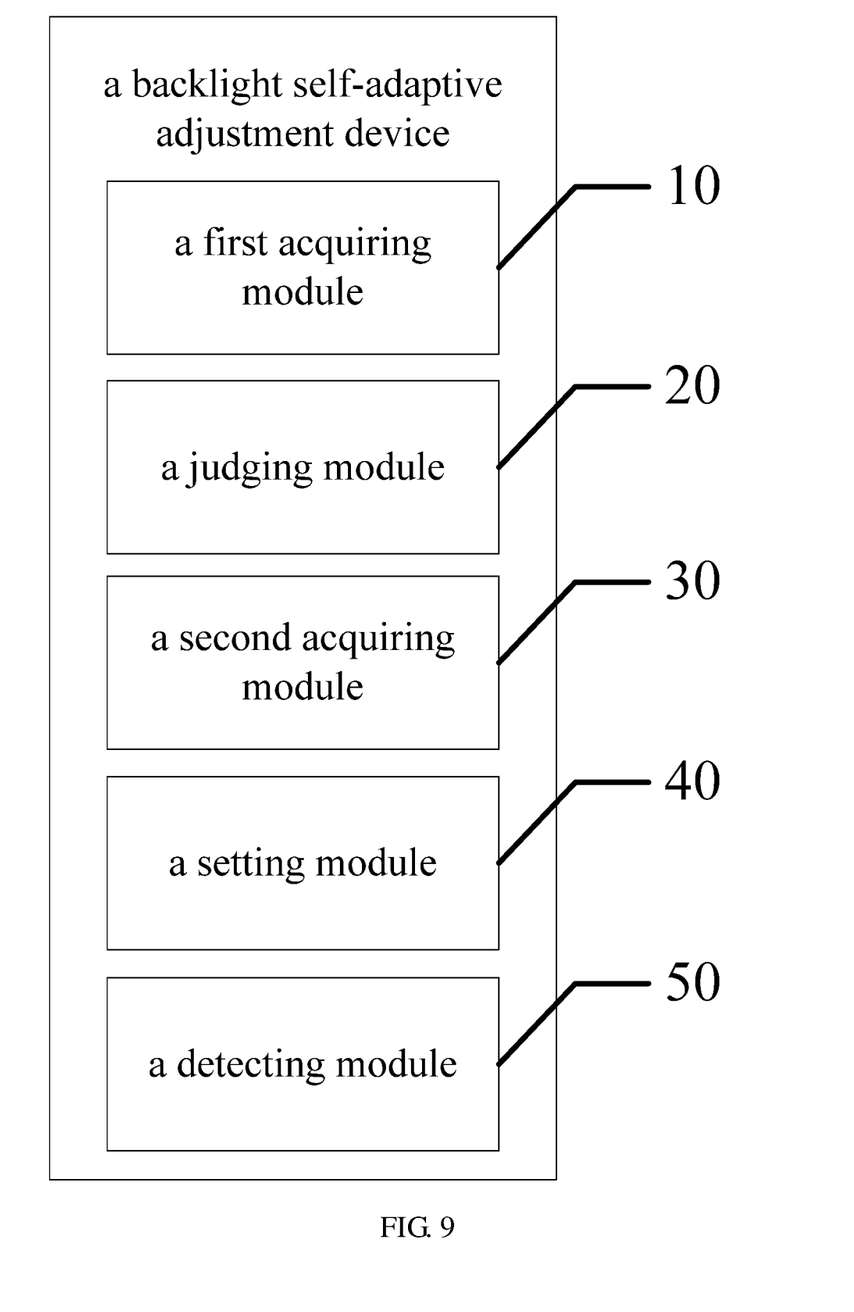
FIG. 9 is a schematic diagram of the functional modules of the backlight self-adaptive adjustment device in the fourth embodiment according to the present disclosure.

The detecting module 50 is configured to detect the brightness of the current ambient via a camera and determine an adjustment range of the backlight value of the display screen according to the brightness of the current ambient.

In the specific implementation process, the functions of each module in the backlight self-adaptive adjustment device correspond to the operations in each method operation in FIG. 5. The foregoing has described these operation operations in detail, no repeat herein.

The above is only the preferred embodiment of the present disclosure and is not therefore limiting the scope of the patent of the present disclosure. Any equivalent structure or equivalent process change made by using the contents of the present specification and drawings, or directly or indirectly applied in other related technical fields, is similarly included in the scope of the patent protection of the present disclosure.

What is claimed is:

1. A backlight self-adaptive adjustment method, applied for television backlight adjustment, wherein the backlight self-adaptive adjustment method comprises the following operations:

acquiring one frame of picture every preset time interval when in video mode;

determining whether a first picture acquired at a moment satisfies a preset backlight self-adaptive adjustment condition according to a brightness difference value between the first picture and a second picture acquired within the preset time interval from the moment, and an amount of white pixels of the first picture;

turning off backlight self-adaptive adjustment mode of a television, when the first picture does not satisfy the preset backlight self-adaptive adjustment condition;

turning on backlight self-adaptive adjustment mode of the television, acquiring a brightness value of a pixel in a third picture captured from current ambient by a camera; and detecting the brightness of the current ambient via the camera, and determining the adjustment range of the backlight value of the display screen according to a brightness of the current ambient, when the first picture satisfies the preset backlight self-adaptive adjustment condition;

determining the backlight brightness of the third picture according to the brightness value of a pixel in the third picture; and setting a backlight value of a display video window area of a display screen within the determined adjustment range of the backlight value of the display screen, according to the backlight brightness of the third picture.

2. A backlight self-adaptive adjustment method, applied for television backlight adjustment, wherein the backlight self-adaptive adjustment method comprises the following operations:

acquiring one frame of picture every preset time interval when in video mode;

determining whether a first picture acquired at a moment satisfies a preset backlight self-adaptive adjustment condition according to a brightness difference value between the first picture and a second picture acquired within the preset time interval from the moment, and an amount of white pixels of the first picture;

acquiring a brightness value of a pixel in a third picture captured from current ambient by a camera, when the first picture satisfies the preset backlight self-adaptive adjustment condition; and setting a backlight value of a display video window area of a display screen based on the brightness value of the pixel in the third picture.

3. The backlight adaptive adjustment method according to claim 2, wherein the operation of determining whether a first picture acquired at a moment satisfies a preset backlight self-adaptive adjustment condition according to a brightness difference value between the first picture and a second picture acquired within the preset time interval from the moment, and an amount of white pixels of the first picture, comprises:

calculating a plurality of brightness difference values between the brightness values of the first picture and the brightness values of the second picture;

calculating the amount of white pixels of a row of pixels in the first picture when the maximum brightness difference value among the plurality of brightness difference values is less than a first preset value; and     determining that the first picture satisfies the preset backlight self-adaptive adjustment condition when the proportion of the amount of the white pixels to the amount of pixels in the whole row is larger than a second preset value.

4. The backlight adaptive adjustment method according to claim 3, wherein the operation of calculating a plurality of brightness difference values between the brightness values of the first picture and the brightness values of the second picture comprises:

respectively acquiring a row of pixels of the first picture and a row of pixels of the second picture at a same position, and determining the brightness values of each pixel in the rows; and     respectively calculating the brightness difference value between a pixel among a row of pixels of the first picture and a pixel among a row of pixels of the second picture at the same position, to acquire the plurality of brightness difference values.

5. The backlight adaptive adjustment method according to claim 2, wherein the operation of setting a backlight value of a display video window area of a display screen based on the brightness value of the pixel in the third picture comprises:

determining the backlight brightness of the third picture according to the brightness value of a pixel in the third picture; and     setting a backlight value of the display video window area of the display screen within the determined adjustment range of the backlight value of the display screen, according to the backlight brightness of the third picture.

6. The backlight adaptive adjustment method according to claim 5, wherein before the operation of determining the backlight brightness of the third picture according to the brightness value of a pixel in the third picture, the method further comprises:

detecting the brightness of the current ambient via the camera, and determining the adjustment range of the backlight value of the display screen according to the brightness of the current ambient.

\* \* \* \* \*